United States Patent
Godsey

(10) Patent No.: US 9,361,393 B2
(45) Date of Patent: Jun. 7, 2016

(54) USER INTERFACE OVERLAY APPLICATION

(71) Applicant: PayPal, Inc., San Jose, CA (US)

(72) Inventor: Sandra Lynn Godsey, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 186 days.

(21) Appl. No.: 13/841,528

(22) Filed: Mar. 15, 2013

(65) Prior Publication Data

US 2014/0282056 A1 Sep. 18, 2014

(51) Int. Cl.
*G06F 3/00* (2006.01)
*G06F 17/30* (2006.01)

(52) U.S. Cl.
CPC ............................... *G06F 17/30893* (2013.01)

(58) Field of Classification Search
CPC .................................................. G06F 17/5081
USPC ....................................................... 715/744
See application file for complete search history.

(56) References Cited

U.S. PATENT DOCUMENTS

| | | | |
|---|---|---|---|
| 6,613,099 B2* | 9/2003 | Crim | 715/210 |
| 8,015,494 B1* | 9/2011 | Hull et al. | 715/746 |
| 2003/0115549 A1* | 6/2003 | Ward | 715/513 |
| 2006/0136829 A1* | 6/2006 | Abbar et al. | 715/744 |
| 2008/0176655 A1* | 7/2008 | James et al. | 463/42 |
| 2009/0259957 A1* | 10/2009 | Slocum et al. | 715/765 |
| 2010/0114857 A1* | 5/2010 | Edwards et al. | 707/709 |
| 2010/0223142 A1* | 9/2010 | Bosan et al. | 705/14.71 |
| 2010/0269050 A1* | 10/2010 | Kirkby et al. | 715/744 |
| 2011/0099137 A1* | 4/2011 | Schein et al. | 706/20 |
| 2011/0154187 A1* | 6/2011 | Sadowski et al. | 715/235 |
| 2012/0144289 A1* | 6/2012 | Morley-Smith et al. | 715/234 |
| 2013/0091417 A1* | 4/2013 | Cordasco | 715/234 |
| 2013/0198609 A1* | 8/2013 | Mokhtarzada et al. | 715/234 |

* cited by examiner

*Primary Examiner* — Omar Abdul-Ali
(74) *Attorney, Agent, or Firm* — Schwegaman Lundberg & Woessner, P.A.

(57) ABSTRACT

A system and method to apply a first User Interface (UI) layout associated with a first system to a second UI associated with a second system. A user overlay interface application identifies the components and/or functionality of a target UI, such as the first UI, to information presented by a second system. In this way, the user may select the UI format desired for multiple systems and thus improve the user experience using multiple systems.

15 Claims, 12 Drawing Sheets

USER INTERFACE OVERLAY APPLICATION

TECHNICAL FIELD

The present application relates generally to the technical field of user interface presentation and, in one specific example, to customizing the user interface layout format in a way desired by the user.

BACKGROUND

When a user accesses a web site via a network, the user interface (UI) presented by the web site may not be a UI that is in a layout format that is satisfactory to a user. Using online shopping as only one example, the user may like to shop online with a UI that is in the layout format presented by market system A because of its ease of use. When the user accesses market system B, the layout format of the UI presented by market system B may be different, and less easy to use, than the layout format of the UI presented by market system A. The end result may be that the shopping experience at market system B is less desirable to the user than that of market system A and may lead to lesser satisfaction than the shopping experience when the user accesses market system A. Consequently the user may be less likely to conclude a transaction on market system B. Additionally, this requires the user to learn multiple interfaces and processes, which leads to confusion and possibly tedious, time-consuming commerce experience. Currently the user cannot customize their experience for similar type processes, such as shopping, banking, networking, advanced search, and so forth. This may be ameliorated if the layout format of the UI presented to the user when accessing market system B were the same, or very similar to, the UI layout format presented by market system A. This may be accomplished by an app or widget that overlays a preferred UI layout format, here that of market system A, including look and feel plus organization, to the UI of market system B. This may be done for all shopping sites, shopping sites being only one example. The result is that all sites may appear consistent, with the look, feel, and organization preferred by the user.

BRIEF DESCRIPTION OF THE DRAWINGS

Some embodiments are illustrated by way of example and not limitation in the figures of the accompanying drawings in which.

DETAILED DESCRIPTION

Figure 1:
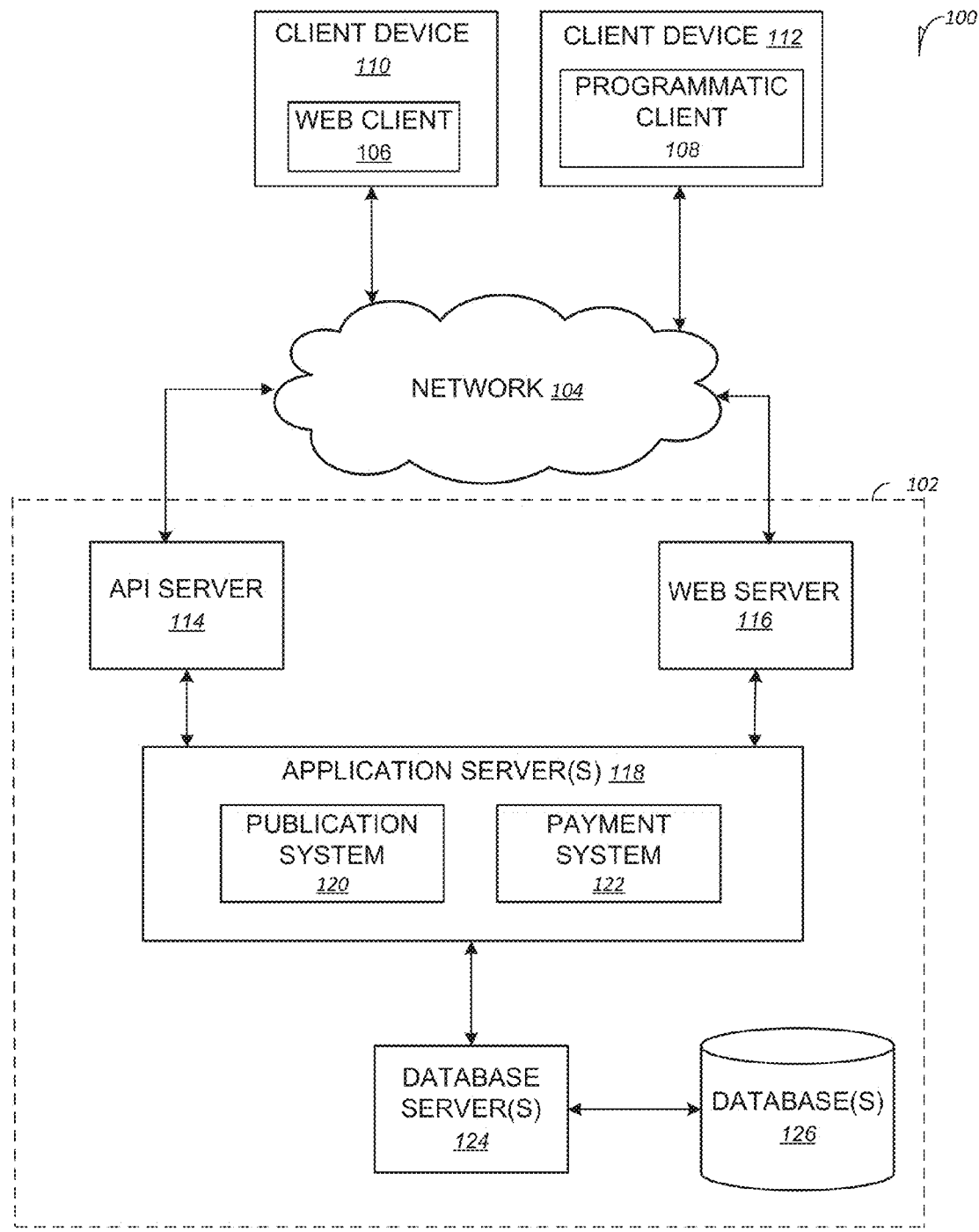
FIG. 1 is a block diagram illustrating a network system, according to example embodiments.

A user overlay interface application or widget that uses a preferred UI layout format to present information from a UI that is offered to a user in a non-preferred UI layout format is disclosed. In one embodiment online shopping is used as an example. However, the user overlay interface application may apply to any online activity. In operation, the user overlay interface application may pull specific common functions, selections, presentations, font, color, and/or size layout format from a preferred web site, or from a web site that is most commonly used by the user. The application then may be used to apply these features to other shopping sites when they present a UI to the user. In this way the other sites appear in a familiar layout making selections and other information easy to find by the user. As devices continue to become smaller, more personal, portable and continuously available, the user experience is greatly diminished when the user is required to learn multiple different formats and layouts for a same activity. This is particularly true for activities having predictable steps, such as shopping or search. In a shopping activity the user discovers products, desires to see more specific information on a product, selects the product, answers questions about product feature selections (such as size, color), inputs quantity, inputs address information, inputs billing information, and completes the transaction and checkout. Some shopping sites provide short cuts and combine activities, such as to remember address or shipping information/preferences. Unfortunately for the consumer, shopping sites lay the predictable steps and features, as well as the short cuts, out in a variety of ways, layouts and formats. The consumer desires a more uniform and consistent means to interface and perform predictable steps, or similar actions on multiple sites. Still further, the consumer may desire to configure the layout to their specific preference, which may not be offered by any site or service provider.

In one embodiment, a user may like to shop at marketing system A and is comfortable with the layout format of the UI presented by marketing system A, referred to herein as UI(A). The user also shops at marketing system B but finds that the UI presented by system B, referred to herein as UI(B), to be difficult to navigate, or just prefers the marketing system A layout format. In the present embodiment, a user overlay interface application is available to apply the UI(A) to the information presented by system B to form a new UI(B'); and when the user accesses or shops on marketing system B the user overlay interface application may move or otherwise modify the components of the System B UI(B) so that it appears in a layout format similar to that of marketing system A UI(A). The user overlay interface application uses the components and information provided and used by system B but presents these components and information in the layout of UI(A).

In one embodiment illustrated below, system A may have a navigation panel positioned vertically down the left hand side of the UI(A). The user finds this layout format easy to navigate and prefers the layout of UI(A). This preferred layout is referred to as L(A) and is the definition of placement and functionality as presented on UI(A). Note that L(A) may refer to a single page of UI(A) or a full set of pages. For example L(A) may be the landing page for system A, or may refer to the full set of pages that a user may navigate on system A. In some embodiments the user may specify a single page of UI(A), such as the checkout page. In some embodiments the user may specify multiple pages of UI(A), and use a user overlay interface application to apply the specified page(s) to other system pages, such as to UI(B). In this way, the user may experience the full variety of pages, but simplify their interactions as desired.

In some embodiments, the user overlay interface application may combine elements on a single page that are otherwise presented on multiple pages. For example, where the shipping and billing addresses entry forms are entered on separate pages, the user overlay interface application may present both entry forms on one page. Alternate modifications may be made by the user or suggested by the user overlay interface application.

Returning to the example of marketing systems A and B, the marketing system B, in contrast to marketing system A, may position a navigation panel horizontally across the top of the UI(B). One of ordinary skill in the art will appreciate that other features of a site's UI may be used to illustrate the user overlay interface application and the present example is provided merely for clarity and understanding. Given that the user overlay interface application pulled the various features from marketing system A UI(A) as discussed above, those features may be applied to the information presented by marketing system B as UI(B') wherein the information is presented to the user in a layout format that is similar to the UI(A) presented by marketing system A. This may be viewed as a redesign of marketing system B's UI. This may be accomplished without changing the function of selectable icons or other functioning elements on the site in any substantial way.

FIG. 1 may be a network diagram depicting a network system 100, according to one embodiment, having a client-server architecture configured for exchanging data over a network. For example, the network system 100 may include a network-based publisher 102 where clients may communicate and exchange data within the network system 100. The data may pertain to various functions (e.g., online item purchases) and aspects (e.g., managing content) associated with the network system 100 and its users. Although illustrated herein as a client-server architecture as an example, other embodiments may include other network architectures, such as a peer-to-peer or distributed network environment.

A data exchange platform, in an example form of a network-based publisher 102, may provide server-side functionality, via a network 104 (e.g., the Internet, wireless network, cellular network, or a Wide Area Network (WAN)) to one or more clients. The one or more clients may include users that utilize the network system 100 and more specifically, the network-based publisher 102, to exchange data over the network 104. These transactions may include transmitting, receiving (communicating) and processing data to, from, and regarding content and users of the network system 100. The data may include, but are not limited to, content and user data such as feedback data; user profiles; user attributes; product attributes; product and service reviews; product, service, manufacture, and vendor recommendations and identifiers; social network commentary, product and service listings associated with buyers and sellers; auction bids; and transaction data, among other things.

In various embodiments, the data exchanges within the network system 100 may be dependent upon user-selected functions available through one or more client or user interfaces (UIs). The UIs may be associated with a client device, such as a client device 110 using a web client 106. The web client 106 may be in communication with the network-based publisher 102 via a web server 116. The UIs may also be associated with a client device 112 using a programmatic client 108, such as a client application. It can be appreciated in various embodiments the client devices 110, 112 may be associated with a buyer, a seller, a third party electronic commerce platform, a payment service provider, or a shipping service provider, each in communication with the network-based publisher 102 and optionally each other. The buyers and sellers may be any one of individuals, merchants, or service providers, among other things. The client devices 110 and 112 may comprise a mobile phone, desktop computer, laptop, or any other communication device that a user may use to access the network-based publisher 102.

Turning specifically to the network-based publisher 102, an application program interface (API) server 114 and a web server 116 are coupled to, and provide programmatic and web interfaces respectively to, one or more application servers 118. The application servers 118 host one or more publication application(s) of publication system 120 and one or more payment systems 122. The application server(s) 118 are, in turn, shown to be coupled to one or more database server(s) 124 that facilitate access to one or more database(s) 126.

In one embodiment, the web server 116 and the API server 114 communicate and receive data pertaining to products, listings, transactions, social network commentary and feedback, among other things, via various user input tools. For example, the web server 116 may send and receive data to and from a toolbar or webpage on a browser application (e.g., web client 106) operating on a client device (e.g., client device 110). The API server 114 may send and receive data to and from an application (e.g., client application 108) running on another client device (e.g., client device 112).

The publication system 120 publishes content on a network (e.g., the Internet). As such, the publication system 120 provides a number of publication and marketplace functions and services to users that access the network-based publisher 102. For example, the publication application(s) of publication system 120 may provide a number of services and functions to users for listing goods and/or services for sale, facilitating transactions, and reviewing and providing feedback about transactions and associated users. Additionally, the publication application(s) of publication system 120 may track and store data and metadata relating to products, listings, transactions, and user interaction with the network-based publisher 102. The publication application(s) of publication system 120 may aggregate the tracked data and metadata to perform data mining to identify trends or patterns in the data. While the publication system 120 may be discussed in terms of a marketplace environment, it may be noted that the publication system 120 may be associated with a non-marketplace environment.

The payment system 122 provides a number of payment services and functions to users. The payment system 122 allows users to accumulate value (e.g., in a commercial currency, such as the U.S. dollar, or a proprietary currency, such as "points") in accounts, and then later to redeem the accumulated value for products (e.g., goods or services) that are made available via the publication system 120. The payment system 122 also facilitates payments from a payment mechanism (e.g., a bank account, PayPal account, or credit card) for purchases of items via the network-based marketplace. While the publication system 120 and the payment system 122 are shown in FIG. 1 to both form part of the network-based publisher 102, it will be appreciated that, in alternative embodiments, the payment system 122 may form part of a payment service that may be separate and distinct from the network-based publisher 102.

Application Server(s)

Figure 2:
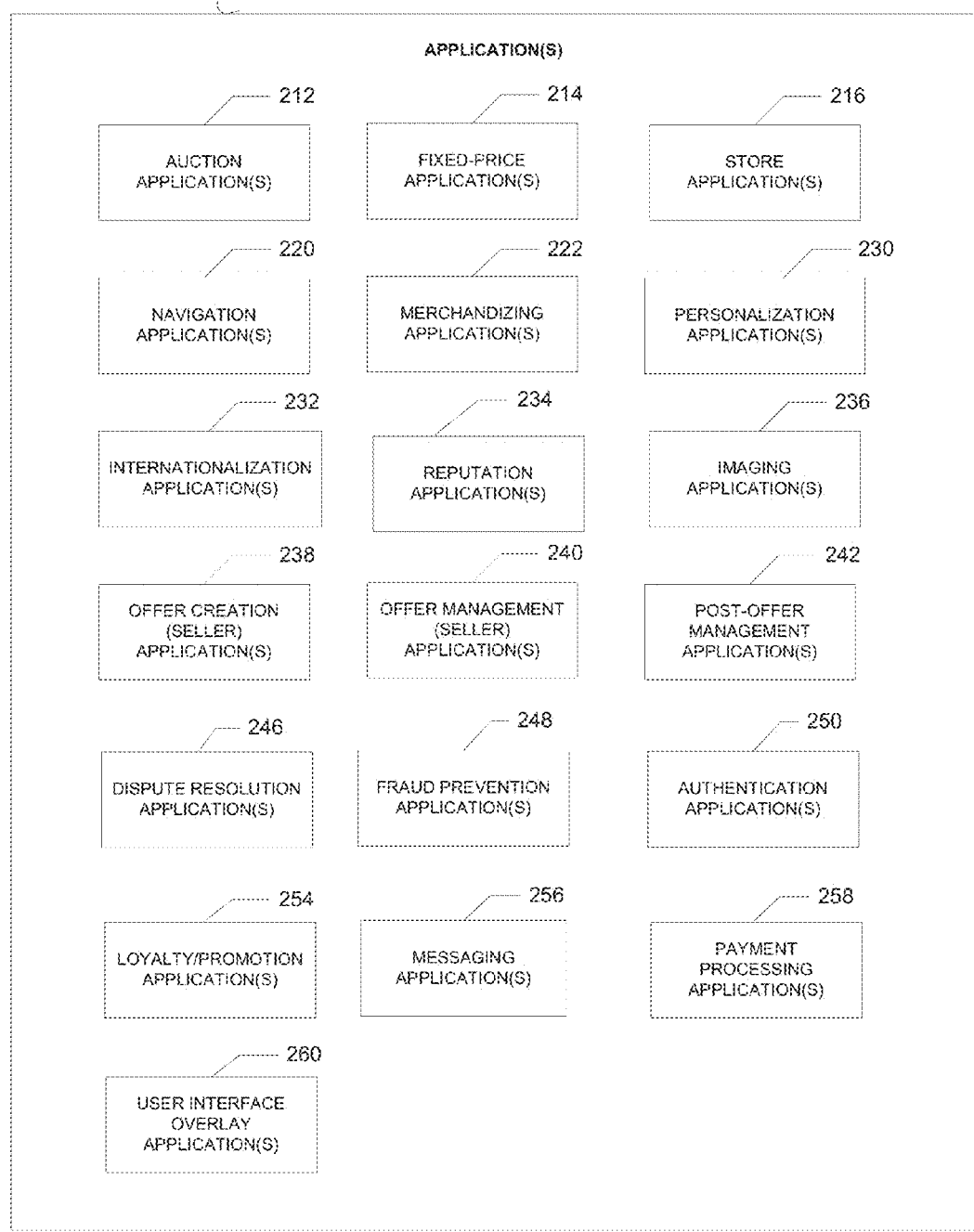
FIG. 2 is a block diagram of applications of the application servers that may form a part of the network system of FIG. 1, according to example embodiments.

FIG. 2 illustrates a block diagram showing applications of application server(s) that are part of the network system 100, in an example embodiment. In this embodiment, the publication system 120, and the payment system 120 may be hosted by the application server(s) 118 of the network system 100. The publication system 120 and the payment system 132 may be hosted on dedicated or shared server machines (not shown) that are communicatively coupled to enable communications between server machines. The applications themselves may be communicatively coupled (e.g., via appropriate interfaces) to each other and to various data sources, so as to allow information to be passed between the applications or so as to allow the applications to share and access common data.

The publication system 120 are shown to include at least one or more auction application(s) 212 which support auction-format listing and price setting mechanisms (e.g., English, Dutch, Vickrey, Chinese, Double, Reverse auctions etc.). The auction application(s) 212 may also provide a number of features in support of such auction-format listings, such as a reserve price feature whereby a seller may specify a reserve price in connection with a listing and a proxy-bidding feature whereby a bidder may invoke automated proxy bidding. The auction-format offer in any format may be published in any virtual or physical marketplace medium and may be considered the point of sale for the commerce transaction between a seller and a buyer (or two users).

One or more fixed-price application(s) 214 support fixed-price listing formats (e.g., the traditional classified advertisement-type listing or a catalogue listing) and buyout-type listings. Specifically, buyout-type listings (e.g., including the Buy-It-Now® (BIN) technology developed by eBay Inc., of San Jose, Calif.) may be offered in conjunction with auction-format listings, and allow a buyer to purchase goods or services, which are also being offered for sale via an auction, for a fixed-price that may be typically higher than the starting price of the auction.

The application(s) of the application server(s) 118 may include one or more store application(s) 216 that allow a seller to group listings within a "virtual" store. The virtual store may be branded and otherwise personalized by and for the seller. Such a virtual store may also offer promotions, incentives and features that are specific and personalized to a relevant seller.

Navigation of the online marketplace may be facilitated by one or more navigation application(s) 220. For example, a search application (as an example of a navigation application) may enable key word searches of listings published via the network-based publisher 102. A browse application may allow users to browse various category, catalogue, or inventory data structures according to which listings may be classified within the network-based publisher 102. Various other navigation applications may be provided to supplement the search and browsing applications.

Merchandizing application(s) 222 support various merchandising functions that are made available to sellers to enable sellers to increase sales via the network-based publisher 102. The merchandizing application(s) 222 also operate the various merchandising features that may be invoked by sellers, and may monitor and track the success of merchandising strategies employed by sellers.

Personalization application(s) 230 allow users of the network-based publisher 102 to personalize various aspects of their interactions with the network-based publisher 102. For example, a user may, utilizing an appropriate personalization application 230, create a personalized reference page at which information regarding transactions to which the user may be (or has been) a party may be viewed. Further, the personalization application(s) 230 may enable a third party to personalize products and other aspects of their interactions with the network-based publisher 102 and other parties, or to provide other information, such as relevant business information about themselves.

The publication system 120 may include one or more internationalization application(s) 232. In one embodiment, the network-based publisher 102 may support a number of marketplaces that are customized, for example, for specific geographic regions. A version of the network-based publisher 102 may be customized for the United Kingdom, whereas another version of the network-based publisher 102 may be customized for the United States. Each of these versions may operate as an independent marketplace, or may be customized (or internationalized) presentations of a common underlying marketplace. The network-based publisher 102 may accordingly include a number of internationalization application(s) 232 that customize information (and/or the presentation of information) by the network-based publisher 102 according to predetermined criteria (e.g., geographic, demographic or marketplace criteria). For example, the internationalization application(s) 232 may be used to support the customization of information for a number of regional websites that are operated by the network-based publisher 102 and that are accessible via respective web servers.

Reputation application(s) 234 allow users that transact, utilizing the network-based publisher 102, to establish, build and maintain reputations, which may be made available and published to potential trading partners. Consider that where, for example, the network-based publisher 102 supports person-to-person trading, users may otherwise have no history or other reference information whereby the trustworthiness and credibility of potential trading partners may be assessed. The reputation application(s) 234 allow a user, for example through feedback provided by other transaction partners, to establish a reputation within the network-based publisher 102 over time. Other potential trading partners may then reference such a reputation for the purposes of assessing credibility and trustworthiness.

In order to make listings, available via the network-based publisher 102, as visually informing and attractive as possible, the publication system 120 may include one or more imaging application(s) 236 utilizing which users may upload images for inclusion within listings. An imaging application 236 also operates to incorporate images within viewed listings. The imaging application(s) 236 may also support one or more promotional features, such as image galleries that are presented to potential buyers. For example, sellers may generally pay an additional fee to have an image included within a gallery of images for promoted items.

The publication system 120 may include one or more offer creation application(s) 238. The offer creation application(s) 238 allow sellers conveniently to author products pertaining to goods or services that they wish to transact via the network-based publisher 102. Offer management application(s) 240 allow sellers to manage offers, such as goods, services, or donation opportunities. Specifically, where a particular seller has authored and/or published a large number of products, the management of such products may present a challenge. The offer management application(s) 240 provide a number of features (e.g., auto-reproduct, inventory level monitors, etc.) to assist the seller in managing such products. One or more post-offer management application(s) 242 also assist sellers with a number of activities that typically occur post-offer. For example, upon completion of an auction facilitated by one or more auction application(s) 212, a seller may wish to leave feedback regarding a particular buyer. To this end, a post-offer management application 242 may provide an interface to one or more reputation application(s) 234, so as to allow the seller conveniently to provide feedback regarding multiple buyers to the reputation application(s) 234.

The dispute resolution application(s) 246 may provide mechanisms whereby disputes arising between transacting parties may be resolved. For example, the dispute resolution application(s) 246 may provide guided procedures whereby the parties are guided through a number of steps in an attempt to settle a dispute. In the event that the dispute cannot be settled via the guided procedures, the dispute may be escalated to a mediator or arbitrator.

The fraud prevention application(s) 248 may implement various fraud detection and prevention mechanisms to reduce the occurrence of fraud within the network-based publisher 102. The fraud prevention application(s) may prevent fraud with respect to the third party and/or the client user in relation to any part of the request, payment, information flows and/or request fulfillment. Fraud may occur with respect to unauthorized use of financial instruments, non-delivery of goods, and abuse of personal information.

Authentication application(s) 250 may verify the identity of a user, and may be used in conjunction with the fraud prevention application(s) 248. The user may be requested to submit verification of identity, an identifier upon making the purchase request, for example. Verification may be made by a code entered by the user, a cookie retrieved from the device, a phone number/identification pair, a username/password pair, handwriting, and/or biometric methods, such as voice data, face data, iris data, finger print data, and hand data. In some embodiments, the user may not be permitted to login without appropriate authentication. The system (e.g., the FSP) may automatically recognize the user, based upon the particular network-based device used and a retrieved cookie, for example.

The network-based publisher 102 itself, or one or more parties that transact via the network-based publisher 102, may operate loyalty programs and other types of promotions that are supported by one or more loyalty/promotions application(s) 254. For example, a buyer/client user may earn loyalty or promotions points for each transaction established and/or concluded with a particular seller/third party, and may be offered a reward for which accumulated loyalty points can be redeemed.

The application server(s) 118 may include messaging application(s) 256. The messaging application(s) 256 are responsible for the generation and delivery of messages to client users and third parties of the network-based publisher 102. Information in these messages may be pertinent to services offered by, and activities performed via, the payment system 120. Such messages, for example, advise client users regarding the status of products (e.g., providing "out of stock" or "outbid" notices to client users) or payment status (e.g., providing invoice for payment, Notification of a Payment Received, delivery status, invoice notices). Third parties may be notified of a product order, payment confirmation and/or shipment information. Respective messaging application(s) 256 may utilize any one of a number of message delivery networks and platforms to deliver messages to users. For example, messaging application(s) 256 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

The payment system 120 may include one or more payment processing application(s) 258. The payment processing application(s) 258 may receive electronic invoices from the merchants and may receive payments associated with the electronic invoices. The payment system 120 may also make use of functions performed by some applications included in the publication system 120.

The publication system 120 may include one or more user interface overlay applications 260. The one or more user interface overlay applications may include information comprising a first user interface layout format and may be configured to enable a client machine to receive a user interface presented in a second user interface layout format, and apply the user overlay interface application to the user interface to modify or change the second user interface layout format to the first layout format. The user interface overlay application may be created by the publication system for communication to a client machine for execution as described in more detail below. Alternatively, a device manufacturer may create the user interface overlay application and embed the application in its devices in an attempt to provide an enhanced user experience. The device could be a desktop computer, a laptop computer, or a computer embedded in a car or in the wall of a home. In view of the increasing use of mobile communications, the device could also be any mobile device such as a smart phone, a personal digital assistant, and the like. The device manufacturer may itself create the application, or have a software manufacturer create the application for embedding in the device or, alternatively, for downloading into the device at or after the time of manufacture.

Figure 3:
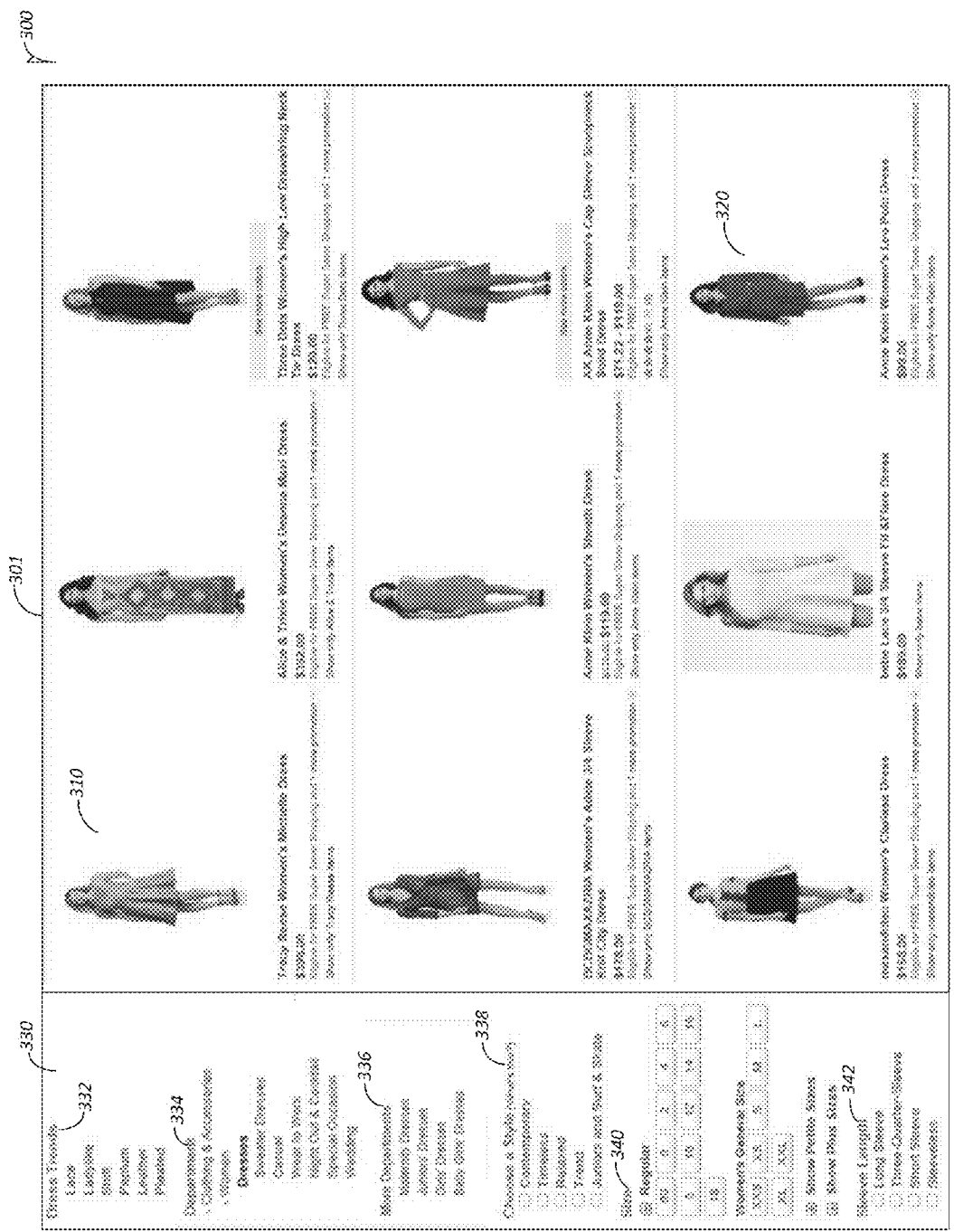
FIG. 3 is an example illustration of a UI having a layout format preferred by a user.

FIG. 3 is an example illustration of UI 300 communicated by web-based publisher 102 to client device 110 over network 104 (as in FIG. 1), which publisher, for the purposes of example, may be called marketing system A. UI 300 may be considered as having a layout format preferred by a particular user because, for at least one reason, this user may find the UI easy to navigate. The layout of UI 300 may be considered the target layout, L(T). The UI 300 is therefore a preferred UI for the user, and may lead to increased sales resulting from a more pleasant and user friendly shopping experience. In the layout L(T) of this UI 300, nine items that are listed for sale are illustrated beginning with Tracy Reese Women's Michelle Dress enumerated 310 to Anne Klieg Women's Leo Polo Dress enumerated 320. A Navigation panel 330 is placed vertically at the left side of the UI. The navigation panel provides as selectable search categories, or icons, Dress Trends 332, Departments 334, More Departments 336, Choose a Style 338, Size 340, and Sleeve Length 342. The user would prefer to apply L(T) of UI 300 to other UIs from other marketing systems at which he or she shops so that these other UIs appear in the layout format of FIG. 3. However, this is usually not the case.

Figure 4:
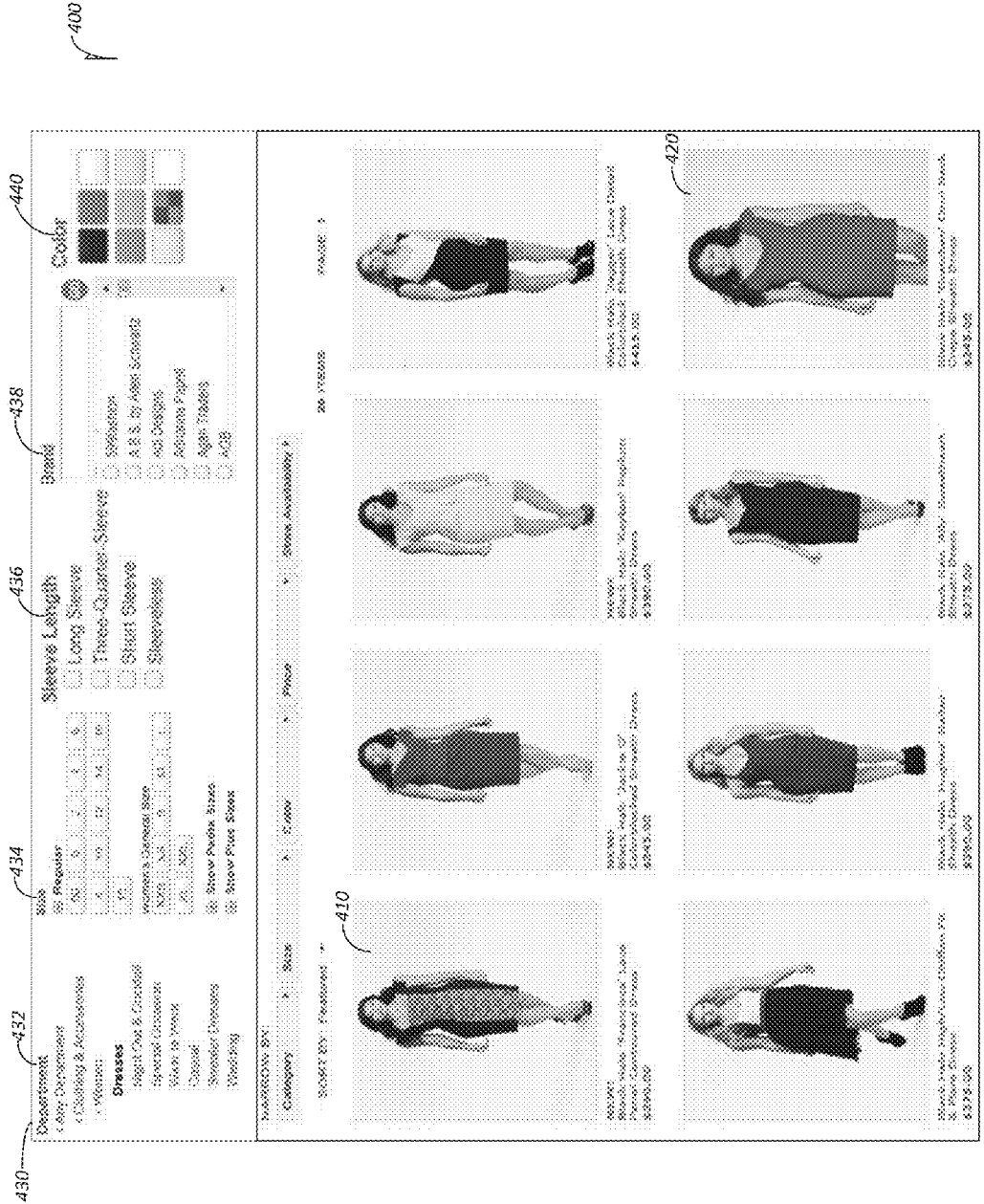
FIG. 4 is an example illustration of a UI having a layout format that the user may find difficult to navigate.

FIG. 4 is an example illustration of UI 400 communicated by another web site to client device 110 over network 104 which web site, for the purposes of example, may be called marketing system B. In this example the UI 400 is one that the particular user may find more difficult to navigate, is therefore not a preferred UI layout for this user, and may lead to less merchandise purchased from market system B. In this example, UI(B) has eight items listed for sale which are illustrated beginning with a Black Halo "Francesca" Lace Panel Contoured Dress enumerated 410 to a Black Halo "Gretchen" Cowl Neck Crepe Sheath Dress enumerated 420. A navigation panel 430 is placed horizontally across the top of the UI 400, instead of the vertical navigation panel at the left of the UI 300 as presented by market system A in FIG. 3. The navigation panel illustrated in FIG. 4 provides as selectable search categories Department 432, Size 434, Sleeve Length 436, Brand 438, and Color 440. Hence it can be seen that UIs presented by different market systems may have different layout formats. So the user under discussion would desire to convert the UI 400 of FIG. 4 to the layout L(T) of UI 300 as in FIG. 3, but without changing any of the functions of the respective selectable search categories or other UI 400 elements. In other words, maintain the information and components, but change their layout. However, the layout format is not the only feature that may have to be taken into account. For example, it can be seen from FIGS. 3 and 4 that UI 300 and UI 400, while for the same type of shopping, here women's dresses, may present different selectable search categories for navigation. FIG. 4 includes as a selectable search category Color 440 that is not included in FIG. 3. FIG. 3, on the other hand, provides Choose a Style 338 as a selectable search category, which is not provided for in FIG. 4. Therefore, in addition to the layout of the UIs, conversion of a UI layout format that is not preferred by a user to a UI layout format that is preferred by the user may have to take into account both the layout configuration of the elements of the UI, and the possibility that each UI may provide selectable search categories or other UI information that differ from the other UI. This conversion is illustrated in FIG. 5 and may be accomplished by the user overlay interface application discussed generally above and described in additional detail below.

In some embodiments the overlay may access the API of various sites and identify similar information. For shopping sites, such information may include the thumbnail images of products, the size chart information, the category information, the color information, and so forth. Each site may provide more or less information than another site. The mechanism of preparing the overlay then involves accessing such information and mapping to a template or desired layout.

Figure 5:
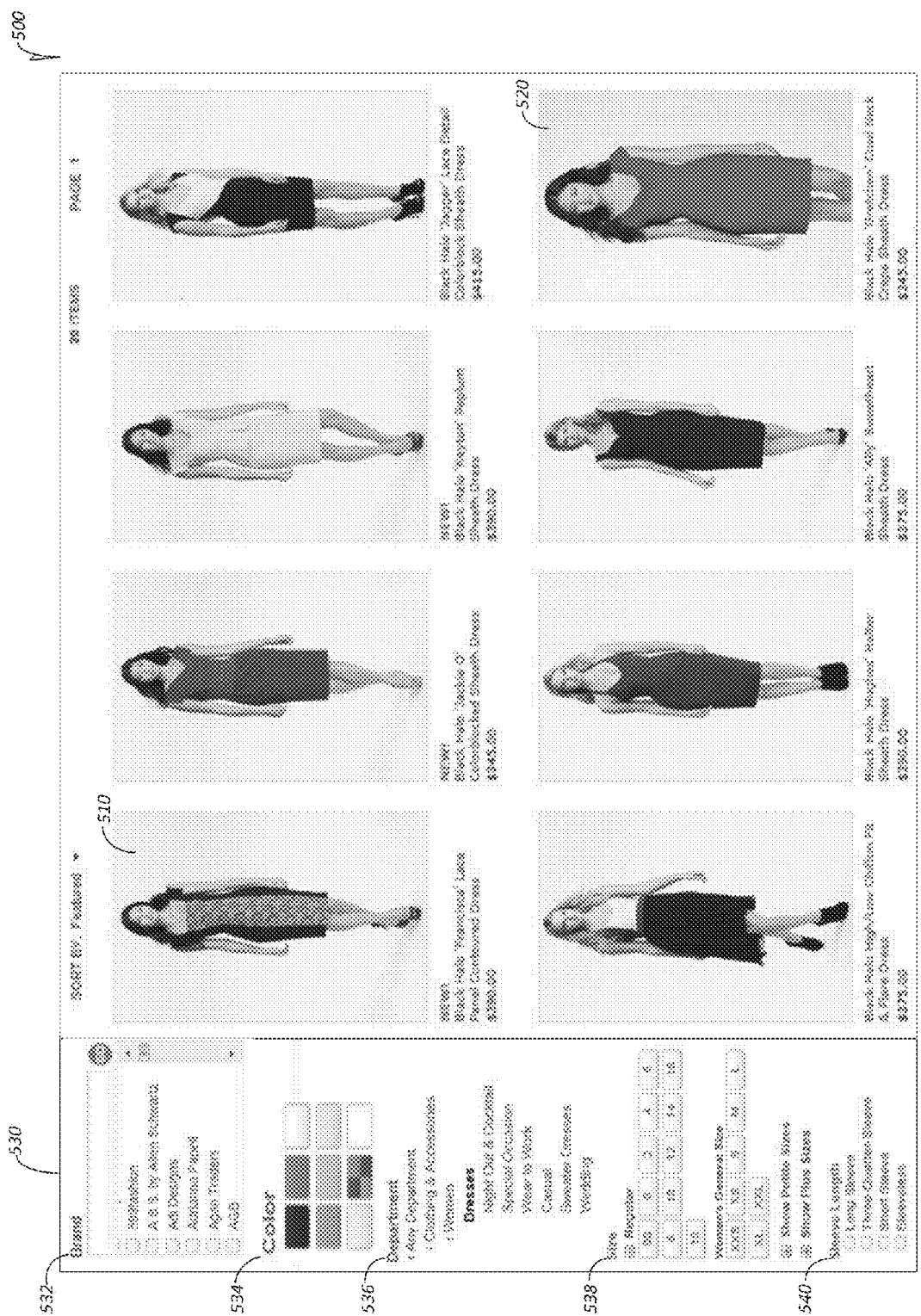
FIG. 5 is an example illustration of the UI of FIG. 4 which has been operated upon by the user overlay interface application.

FIG. 5 is an illustration of a UI 500 which is the result of applying an overlay to the UI 400 of FIG. 4, such as after the embodiment of the user overlay interface application disclosed herein operates on it, converting it to UI 500. As can be seen, the position of dresses offered for sale (as presented on the layout of UI 400), now enumerated from 510 to 520, have not been changed on UI 500. However, the navigation panel 530 has been moved from being placed horizontally across the top, as in UI 400 as seen in FIG. 4 (a layout format which is not preferred by the user), to being located vertically down the left hand side of UI 500, which is the user's preferred layout format for the UI. In addition, a comparison of FIG. 3 and FIG. 4 illustrates that selectable search categories for Department 432, Size 434, and Sleeve Length 436 are offered by both UI 300 and UI 400. The user overlay interface application may place these elements in the same location in the vertical navigation panel 530 of FIG. 5 as they are located on the preferred UI 300 of FIG. 3. This is seen at 536, 538, and 540 of FIG. 5. However, the selectable search categories Dress Trends 332, Departments 334, More Departments 336, and Choose a Style 338 of FIG. 3 are not selectable search categories offered by UI 400 of FIG. 4, and therefore may be left out of the vertical navigation panel of FIG. 5 and replaced by Brand 438 (which is placed as 532 of FIG. 5), and Color 440 (which is placed as 534 of FIG. 5) in the conversion. While the above discussion has been in terms of two shopping sites, it will be appreciated by those of ordinary skill in the art that the user overlay interface application may be used to provide user-preferred UIs for any type of online activity.

User Overlay Interface Application

The user overlay interface application may be implemented and operate in conjunction with client device 110. In one embodiment, the user overlay interface application may be resident at client machine 110 of FIG. 1. However, one of ordinary skill in the art will appreciate that the application may be resident elsewhere. Further, in one embodiment the user overlay interface application may originate with the network-based publisher 102 and be communicated to the client device 110, or other device, for use. This embodiment may hold advantages in that the network-based publisher 102 may install a cookie on the client device 110 to which the application is communicated. In such an instance the network-based publisher 102 may then be notified when the client device accesses a competitor web site to operate the user overlay interface application, and may also be notified of the articles the client device is querying. Some network-based embodiments may then apply the user's selection and preferences to be applied as an overlay on multiple devices, without storing cookies or other information on the individual devices. In this way, the user's layout preferences travel with the user and may be applied any time the user accesses similar type sites. The network-based publisher may then use this information to communicate an advertisement for its own products to the client device.

Figure 1A:
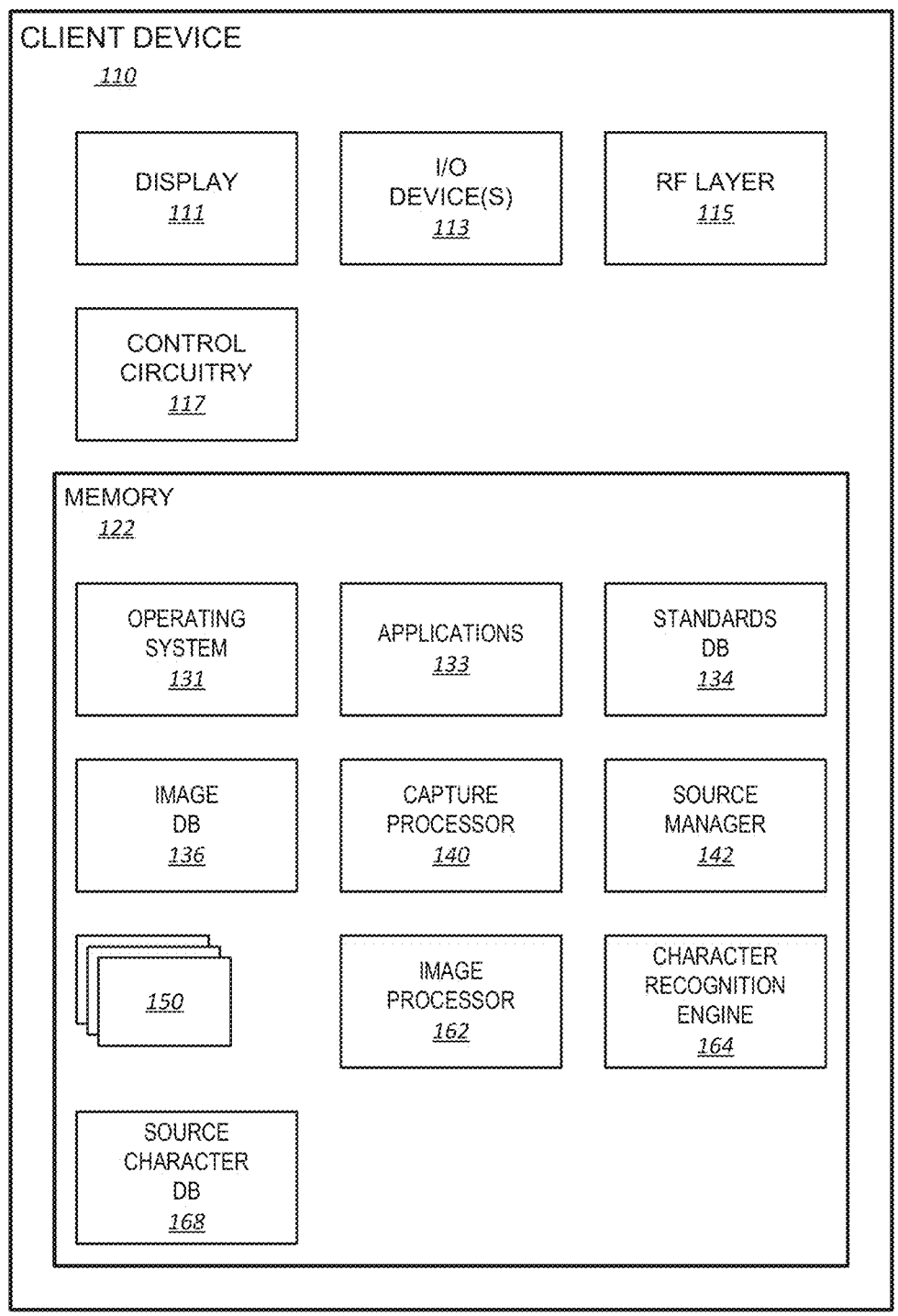
FIG. 1A is a block diagram of a client device, according to an embodiment.

FIG. 1A illustrates an embodiment of client device 110 of FIG. 1 to which the user overlay interface application may be communicated for use. Client device 110 may be implemented using one or more computing devices as described hereinafter. In one example, client device 110 may be a mobile device such as a smart phone, cell phone, personal digital assistant, hand held computer, laptop, etc. Client device 110 may also include non-mobile devices such as servers, desktop computers and/or other dedicated computing devices. In FIG. 1A, client device 110 includes a display 111 (e.g., liquid crystal display), one or more input/output (I/O) devices 113, radio frequency (RF) layer 115, control circuitry 117, and memory 122. The various components of client device 110 may communicate over one or more buses (not shown) to the network-based publisher 102, and to other web sites, via the Internet. Communication with other web sites may be implemented similarly. Other components of client device 110, such as peripheral device ports, audio and video interfaces and other components not pertinent to the present disclosure are not shown.

I/O devices 113 can include commonly known inputs such as side input elements (e.g., rotary switches), face mounted input elements such as buttons, multi-key keyboards, or other manual input elements. Still further I/O devices may include biometric mechanisms which allow the user to navigate and control the device using non-conventional and/or non-mechanical inputs. In one example, I/O devices 113 may include display 111, such as where display 111 is a touch screen device capable of receiving manual input as well as providing visual output.

Control circuitry 117 can include one or more microprocessors such as a central processing unit(s) (CPU) and/or a graphical processing unit(s) (GPU). The control circuitry communicates with RF layer 115 to transmit and receive radio frequency communications. During transmission, the control circuitry may provide a voice signal from a microphone or other data signal to the RF layer. The RF layer transmits the signal to a remote station, for example a fixed station operator or other cellular phones, etc. Transmissions to and from the RF layer can be conducted under control of the operating system 131. Communications received by the RF layer may be disseminated to applications via the operating system 131 and vice versa. During a receiving mode, the RF layer receives a voice or other data signal from a remote station or other device which are processed appropriately. The control circuitry may include or further communicate with audio and video interfaces. An audio interface, for example may be used with a speaker to provide audible signals to a user and a microphone to receive audible signals from the user.

Memory 122 can include various volatile and/or non-volatile memory. Memory 122 can store processor readable code that is executable by one or more processors of control circuitry 117 to implement various functionality described herein. Operating system 131 resides in memory 122 and is executable on or by control circuitry 117. Various applications 133 may be loaded into memory 122 and run on or outside of the operating system 131. Examples of applications 133 include phone dialer programs, e-mail programs, personal information management programs, word processing programs, spreadsheet programs, internet browser programs, games, social networking applications, shopping applications, global positioning system applications, the user overlay interface application under discussion, and so forth. Applications 133 may use and store information in non-volatile storage such as e-mail or other messages used by an e-mail application, contact information used by a personal information management program, documents used by a word processing application, information from web sites for use by the user overlay interface application, and other information. In one embodiment, applications 133 include an application provided by capture processor 140 to facilitate operation of the user overlay interface application using image-capture capabilities for capturing images from UIs communicated to client device 110 by web sites, and operating on the images with the user overlay interface application.

Image DB 136 for including previously stored known UI images, layout dimensions, and other UI information may be maintained at the client device. A standards database 134 may also be maintained for including known standards such as aspect ratios and the like relating to various types of images at a UI.

Capture processor 140 enables the acquisition (or "capture") of images of a UI communicated to client device 110, for example by network-based publisher 102, as well as UIs communicated by other web sites. In one embodiment, in response to a request to access network-based publisher 102, a UI may be communicated to client device 110 by the network-based publisher 102 and a set of UI images such as images of preferred UI 300 of FIG. 3, may be captured by capture processor 140. In addition layout format and element locations of the UI may also be captured as discussed below. Capture processor 140 may apply a capture overlay box, or bounding box, to the UI. The capture overlay box seen in one example at 301 of FIG. 3 includes dimensions corresponding to the aspect ratio of a UI. In one embodiment, the overlay box provides color-coded feedback indicating alignment of the UI. For example, each line of the bounding box may be provided in a first color when no corresponding edge of the UI has been detected and provided in a second color when the corresponding edge of the UI is detected. In some embodiments the capture processor 140 identifies the location of images, features, characteristics of one or more UI layouts. These are then used to determine the correction or modification to apply the desired overlay to a given configuration of elements. The ability to customize the user's experience to a convenient and comfortable interface. The user may then navigate and make purchasing decisions quicker and with less concentration. The user may determine further customizations over time and may configure their own interface. This may the case where the user does not desire to see the information associated with the position in the category tree or other information. In some embodiments the user may desire to preconfigure sizes, colors, price ranges or so forth.

In one embodiment, capture processor 140 identifies contrasts in the scene(s) depicted by images stored at 150. In this manner, the contrast between the UI and one or more backgrounds may be identified as corresponding UI edges for use in defining such elements as navigation panels and the like. Contrasts may consider color, shading, sizing, font size, location of text, and other considerations. Still further the capture processor 140 may contrast selection styles of boxes, circles, checks, sliding selectors, and so forth.

In an embodiment, an area or portion of the selected image(s) within an identified boundary is clipped or extracted from the image if needed, for example, for storing as a known image in image DB 136 discussed below. Portions of the representation having a known correspondence to relevant portions of the UI may be identified. For example, a portion of the representation corresponding to a lower third of a UI may be identified and extracted for the UI if needed. Further, any portion of the image within a bounding overlay box may be extracted.

These images and other information may be stored as images in storage 150 and may also be stored in image DB 136 to which storage 150 and capture processor 140 may be coupled. In one embodiment, such images and other UI information such as dimensions and layout information of UI 300 may be stored in image DB 136 as "known images" during a learning process by which the user overlay interface application "learns" the configuration of the preferred UI 300. Subsequently, when the user overlay interface application operates on a non-preferred UI such as 400 of FIG. 4, to convert it to a preferred UI such as 500 of FIG. 5, in one embodiment the user overlay image application will compare captured images of UI 400 against known images of preferred UI 300 that are stored in image DB 136.

Learning the Configuration of the Preferred UI

Figure 3A:
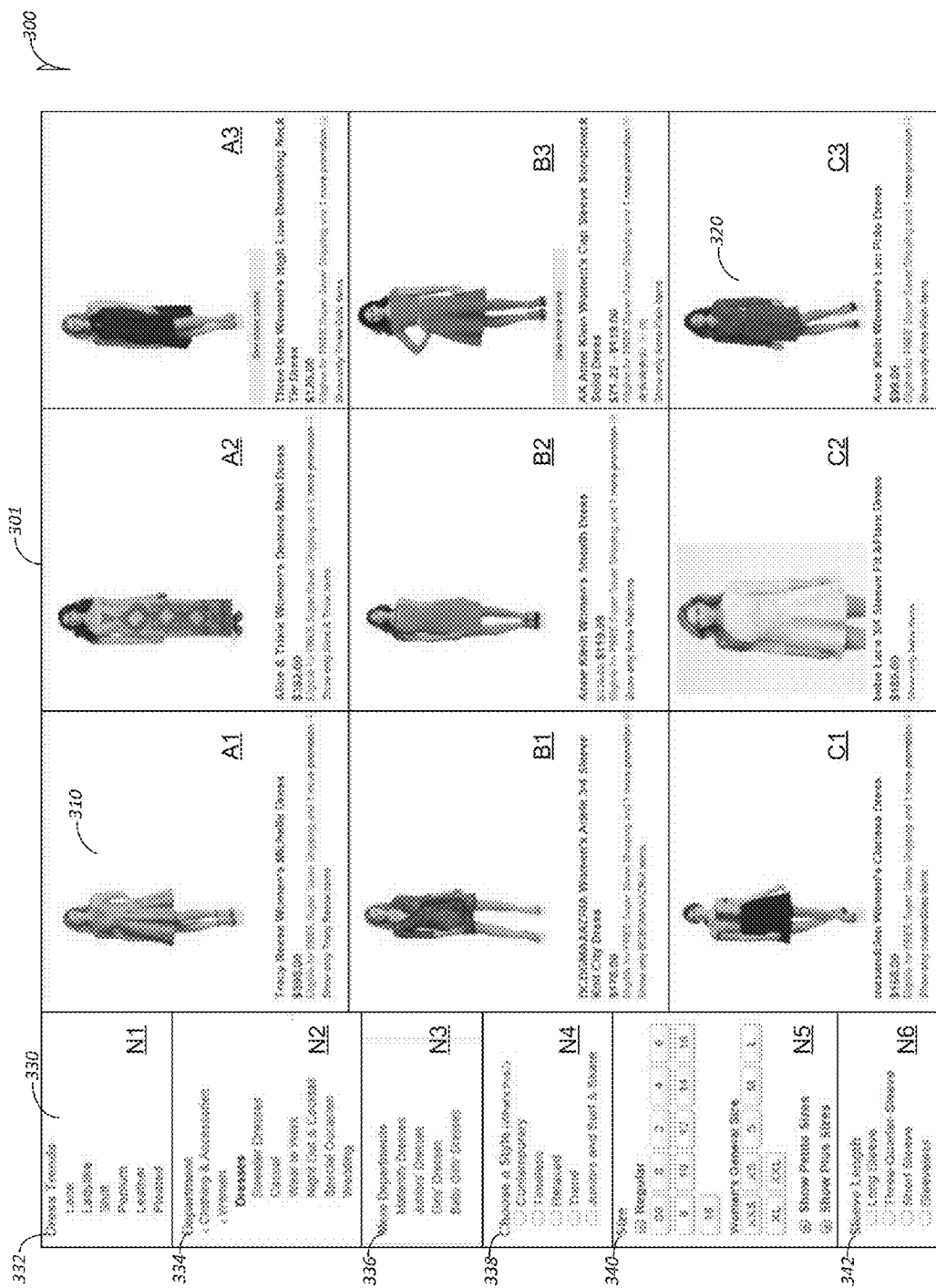
FIG. 3A is an example illustration of a UI having superimposed thereon a grid for locating elements of the UI.

In one embodiment, in response to client device 110 receiving a user-preferred UI 300 of FIG. 3, the user may activate the user overlay interface application. In response, capture processor 140 may capture images and other information from the preferred UI 300 into storage 150. Image processor 162, discussed below, and may perform at least a first set of image processing steps on the images and other information in storage 150. In one example, such processing steps may include determining the physical characteristics of the UI images, such as size, appearance, display location on the UI, dimensions, and selectable search category icons, and storing them as known images in image DB 136. Client device 110 may include image processor 162, character recognition engine 164, and source character DB 168. Image processor 162 and character recognition engine 164 may process images and characters from UI 300. Source character DB 168 may include characters and, in some cases, images which are operated on by image processor 162 and character recognition engine 164 which may compare them to characters and images captured by the capture processor 140. In one example, image processor 162 segments images in storage 150 to identify and/or extract areas that contain relevant portions of UI 300. From the identified areas, image processor 162 generates individual images. In one embodiment processor 162 may also generate images for each of the selectable search categories, or icons, and other characters of the communicated UI. This may again be accomplished by use of character recognition engine 164 for image comparison and by source character DB 168. For example, the character images generated by processor 162 may be passed to the character recognition engine 164, which applies a suitable optical or other character recognition process to identify the character associated with each character image. Character recognition engine 164 may utilize a database of source-based images in a database 168, such as those of characters found on UIs, to determine respective characters for character images of UI 300 and/or provide a character analysis. These processes may also use known standards such as aspect ratios from standards database 134, alluded to above, in the comparison as needed to establish UI layout format information. In one embodiment, the physical characteristics of the images of UI 300, such as size, color appearance, position on the UI, and dimensions of the UI layout format, and selectable search category icons, among other things, may be determined and, as discussed above, stored in image DB 136 as known (or learned) images. The information acquired by these processes can, by using well known layout processes, be used to identify images, selectable search category icons, and other information that appear on UI 300 and position them on the UI in an overlay. In one embodiment a grid such as that illustrated in FIG. 3A may be used to define the position of each image, selectable search category, and other information, for its placement on the UI. The grid superimposed on the UI 300 in FIG. 3A may, for example, identify navigation panel element 332 with grid location N1, navigation panel element 334 with grid location N2, navigation panel element 336 with grid location N3, and so on. If desired, listings may be identified as located in grid locations A1 through C3. Each grid location may be associated with the particular UI element, or parts thereof, and stored in image DB 136 for later use in converting a UI with a non-preferred layout format to a UI with a preferred layout format.

Figure 6:
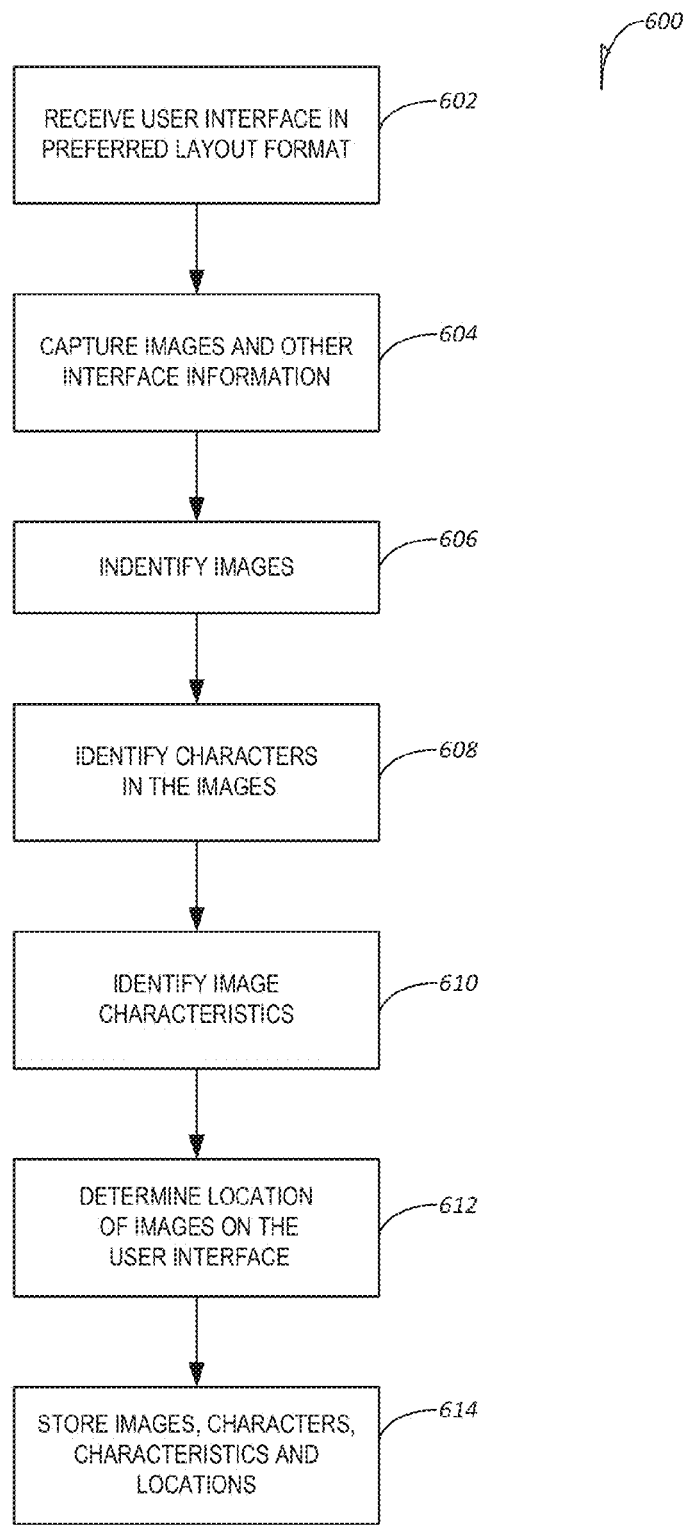
FIG. 6 is a flowchart illustrating an embodiment of operation of the learning function of the user overlay interface application.

An illustration of the learning process discussed above may be seen from method 600 of the flow chart of FIG. 6. At operation 602, client device 110 may receive a UI 300 in a layout format that is preferred by the user. At operation 604, images and other interface information may be captured as discussed above with respect to capture processor 140 of FIG. 1A. At operation 606 the captured images may be identified. Similarly the characters in or associated with the images may be identified at operation 608, and characteristics of the images may be identified at operation 610. The identity of these images, characters, and characteristics may be performed using image processor 162, character recognition engine 164, and source character DB 168 as discussed above. The location of the images, characters, and characteristics may be determined at operation 612 using well known layout methods such as the grid example discussed above with respect to FIG. 3A. At 614 the images, characters, characteristics, and locations respectively associated with each of them, may be stored as known images in a database such as image DB 136. These known images may be used in operation of the user overlay interface application discussed below.

User-Designed User Interface

In another embodiment, the user may desire to design his or her personal or preferred UI layout format to use for online activities. In this embodiment the user builds the layout of elements of the UI, such as by using drag and drop functions, the result being the UI layout format the user prefers. This may be accomplished with a process including the learning function described above. When completed, the function results in an overlay that can be used to convert a UI with a non-preferred layout format to a UI with a preferred layout format. In this instance, however, the preferred layout format has been created by the user, as opposed to being a layout format the user likes from a particular web site.

In some embodiments the user's behavior is identified as preferential and suggested to the user. For example, if the user has difficulty entering data while on their phone, the user overlay interface application may identify one format that is easier for the user in which the user erases less or is able to complete a transaction quicker. Other behaviors may help to design a custom experience for the user, such as where the user prefers to select options using a slide motion, or a click motion. Similarly, this may be a site that the user visits often, or in combination with another site and therefore the user overlay interface application may help to anticipate next steps and prepare or pull information before the user needs it to increase the speed of the transaction. For example if the user usually scrolls down to view information at a given position or a relative position on the page (relative to other information), the user overlay interface application may anticipate this and pull that information for quick presentation. A variety of actions, behaviors and anticipated actions may be considered and implemented in a user overlay interface application.

Figure 3B:
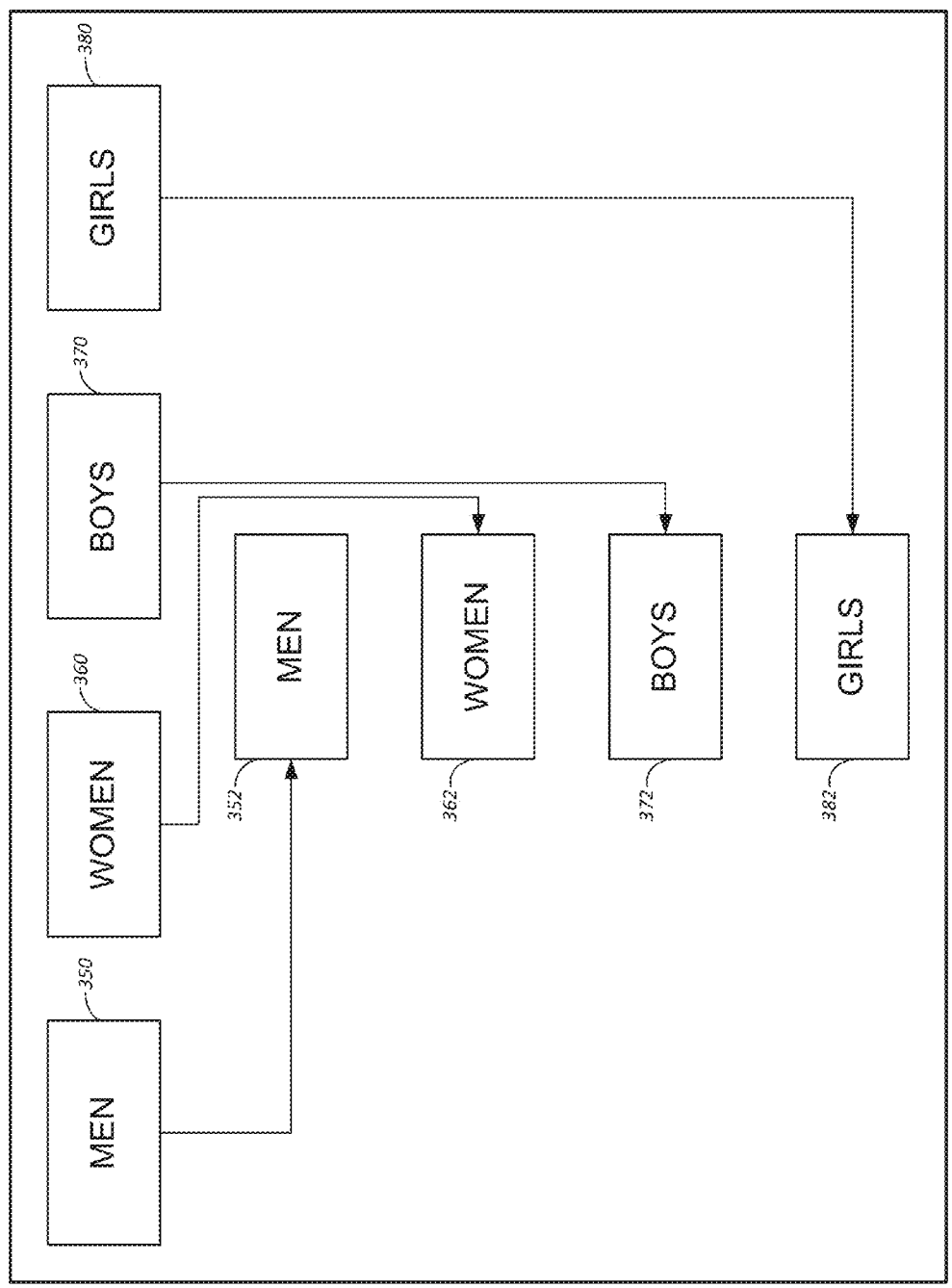
FIG. 3B is an example of configurable locations to overlay a target UI according to example embodiments.

The user may build the user overlay interface application in one embodiment as follows. A UI such as UI 301 seen in FIG. 3B, may be communicated to the client device 110. The UI may not be in a layout format preferred by the user. For example, UI 301 has selectable search categories Men 350, Women 360, Boys 370 and Girls 380 located horizontally across the top of the UI. The user may prefer that the selectable search categories to be located vertically down the center of the UI. The user may achieve this layout by overlaying a grid on the UI of FIG. 3B, much like the grid of FIG. 3A. The user then drags and drops Men 350 to the center at Men 352; Women 360 to the center at Women 362; Boys 370 to the center at Boys 372; and Girls 380 to the center at Girls 382. This may be accomplished using well known technology such as that used to relocate selectable categories of UIs of other applications such as, for example, relocating selectable category icons on an email system. When, or as, the selectable search categories are relocated on UI 301, capture processor 140 may store the relocated images in storage 150 of FIG. 1A. Image processor 162 and character recognition engine 164, discussed above, may perform image processing steps on the images and other information in storage 150. For example, source character DB 168 may include characters and, in some cases, images. These may be operated on by image processor 162 and character recognition engine 164 to compare them to characters and images captured by the capture processor 140 to identify elements of UI 301 and their locations. From the identified elements, image processor 162 generates individual images. In one embodiment image processor 162 may generate images for each of the selectable search categories, or icons, and other characters of UI 301. Image processor 162, character recognition engine 164, and source character DB 168, and standard DB 134 may function as described above when learning the configuration of the preferred UI to determine respective characters for character images of UI 301 and/or provide a character analysis. In one embodiment, the physical characteristics of the images of UI 301, such as size, color appearance, position on the UI, and dimensions of the UI layout format, and selectable search category icons, among other things, may be determined and, as discussed above, stored in image DB 136 as known (or learned) images. The information acquired by these processes can, by using well known layout processes, be used to identify images, for example the relocated selectable search categories 352, 362, 372, and 382 on UI 301 and locate them on the UI in an overlay. In one embodiment a grid such as that illustrated in FIG. 3B may be used to define their position. The foregoing processing steps may include determining the physical characteristics of the UI images (again, for example, 352, 362, 372, and 382) such as size, dimensions, and appearance, and their ending position placement on UI 301, and storing them as known images in image DB 136. Each grid location may be associated with the particular UI selectable search category and stored in image DB 136 for later use in converting another UI with a non-preferred layout format to a UI layout format created by the user as described below.

Operation of the User Overlay Interface Application

After the above learning processes, the user overlay interface application may be activated to convert a UI with a non-preferred layout format to a UI with a preferred layout format. For example, the client device 110 may be presented with UI 400 of FIG. 4, which UI is in non-preferred layout format. The user overlay interface application can be activated to convert UI 400 from having a non-preferred layout format to UI 500 of FIG. 5 having a preferred layout format by relocating elements of UI 4 to the layout format of UI 500 in FIG. 5. In one instance the overlay may be that generated above for the preferred UI from a particular web site. In another instance the overlay may be that generated by the user using the drag and drop process described above.

In one embodiment, in response to a web site communicating a non-preferred UI 400 to client device 110, capture processor 140 may capture images and other information from the non-preferred UI 400 of FIG. 4 into storage 150 as was done with respect to UI 300 during the above learning process. Similarly to the learning process, image processor 162 may perform at least a first set of image processing steps on the set of images and other information in storage 150. In one example, such processing steps may include comparing the physical characteristics of the UI images, such as size, appearance, position on the UI, dimensions, and selectable search category identity with known images of similar parameters of preferred UI 300 stored in image DB 136. Client device 110 may include image processor 162, character recognition engine 164, and source character DB 168. Image processor 162 and character recognition engine 164 process images and characters as previously discussed. Source character DB 168 may include characters and, in some cases, images which are operated on by image processor 162 and character recognition engine 164. In one example, image processor 162 segments images in storage 150 to identify and/or extract areas that contain relevant portions the UI, here UI 400. From the identified areas, image processor 162 generates individual images. In one embodiment image processor 162 may also generate images for each of the selectable search categories or other characters of the communicated UI 400. This may be accomplished by use of character recognition engine 164 for image comparison and source character DB 168 for comparison of the other information as was done during the learning process with respect to UI 300. These processes may also use known standards such as aspect ratios from standards database 134, also alluded to above, in the comparison process as needed to establish UI layout information.

The comparison of the images of UI 400 of FIG. 4 with known images of preferred UI 300 that are stored in image DB 136 as known images may also take into account the possibility that UI 400 may provide selectable search categories or other UI information that differ from those of UI 300. This may be accomplished by the image processing discussed above with respect to image processor 162, character recognition engine 164, source character DB 168, and source character DB 168 to determine characters for each character image and/or provide a character analysis. The information acquired by these processes can, by using well known layout processes, be used to identify images and selectable search category icons on UI 400 of FIG. 4 and relocate them as illustrated in UI 500 of FIG. 5. This converts the layout format of UI 400 of FIG. 4, which is not preferred by the user, to the layout format of UI 500 of FIG. 5, which is preferred by the user, as was discussed above.

The above relocation process may be accomplished by superimposing a grid on UI 400, much the same as was done for UI 300 discussed above. The image processing would identify relevant layout format elements in UI 400 that are the same as, or similar to, those of UI 300, and the location of the identified relevant layout format elements from grid location associated with those known images stored in image DB 136. The relevant elements of FIG. 4 may be relocated on FIG. 4 in the same locations that they were detected to appear on FIG. 3 during the learning process, e.g., the known grid positions stored in image DB 136. Images of UI 400 that do not appear on UI 300 may be placed at a location on UI 400 that matches the layout format of FIG. 3. For example, from the images of the superimposed grid of FIG. 3 it can be determined that the navigation panel lays vertically down the left side of UI 300. Consequently, navigation elements from the horizontal navigation panel of UI 400 that do not appear on the vertical navigation panel of UI 300 may be appropriately placed on UI 400, so long as they are placed in a vertical navigation panel on the left side of UI 400. At completion of the conversion process, UI 400 will look like UI 500 of FIG. 5, which is in a layout format preferred by the user.

Figure 7:
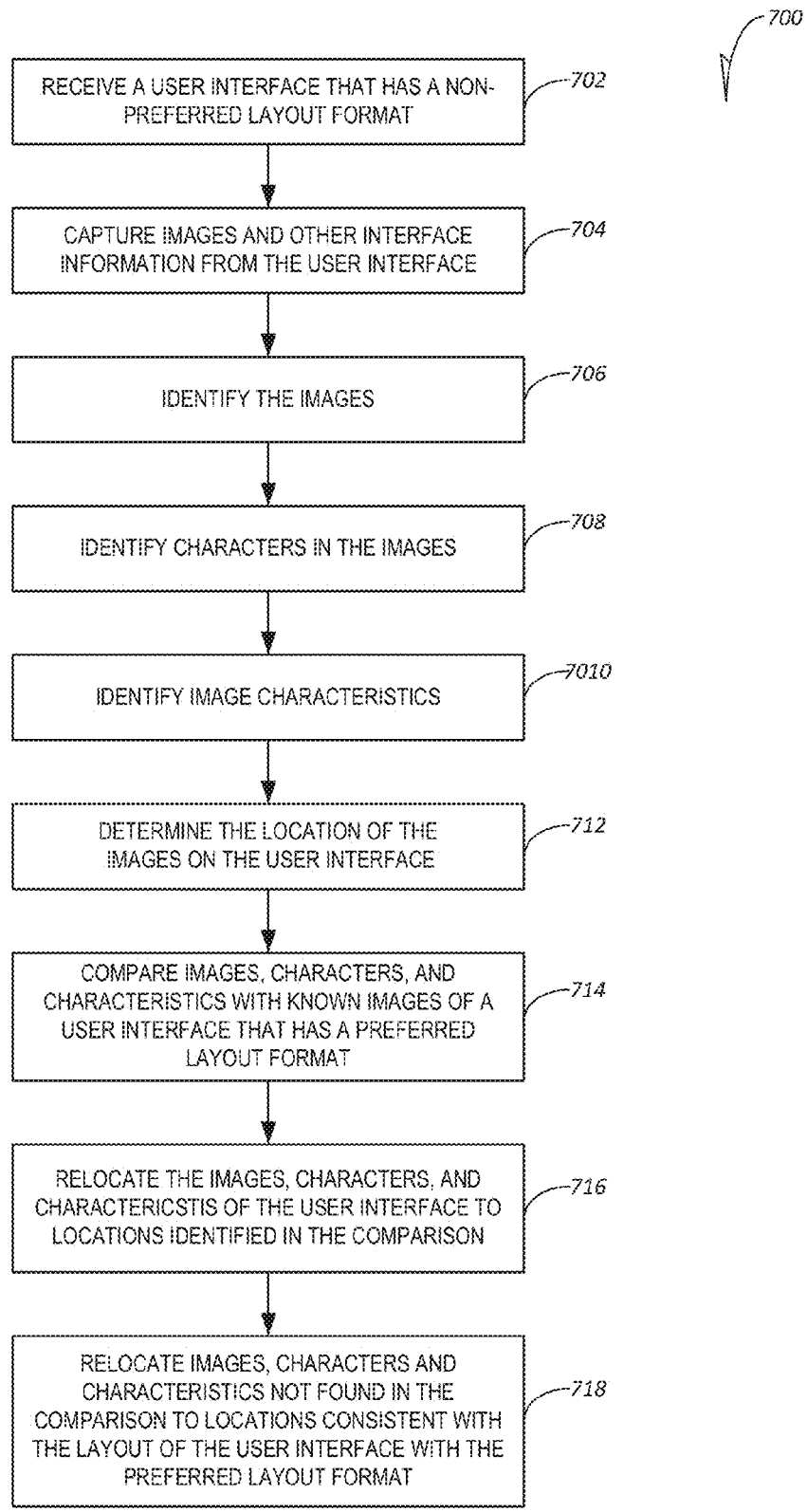
FIG. 7 is a flowchart illustrating an embodiment operation of the user overlay interface application in converting a user interface layout format from a non-preferred layout format to a preferred layout format.

An illustration of operation of the user overlay interface application may be seen from method 700 of FIG. 7. At operation 702, client device 110 receives a UI 400 that has a layout format that is not preferred by the user. The user overlay interface application may be activated. At operation 704, images of the UI, and other UI information, may captured by capture processor 140 of FIG. 1A. The images such as 410, characters in the images such as the characters within image 432, and image characteristics such as a cart at a certain location on the interface (not shown), may be identified at operations 706, 708, and 710 using image processor 162, character recognition engine 164, and source character DB 168 as described above. The location of the images on the non-preferred UI may be identified at operation 712 using well known layout methods such as the grid example discussed with respect to FIG. 3A. The images, characters, and characteristics of the non-preferred UI may be compared at 714 with known images, characters, and characteristics of the preferred UI 300 stored as known images in image DB 136. This comparison results in a determination of images, characters, and characteristics of the preferred UI 300 that are the same or similar to those of the non-preferred UI 400. The comparison also results in determining their locations on the preferred UI since these locations were stored as associated with the known images in image DB 136. At operation 716 the user overlay interface application may relocate the comparison-determined images, characters and characteristics of the non-preferred UI 400 to locations determined in the comparison. At operation 718 the application may also relocate images, characters and characteristics of UI that are not found in the comparison, the relocation being to locations consistent with the layout of the UI with the preferred layout format 300. This latter relocation applies to images, characters, and characteristics that are not already in such consistent locations on UI 400. The result will be the received UI that is now in the layout format preferred by the user, as seen at 500 of FIG. 5.

Figure 8:
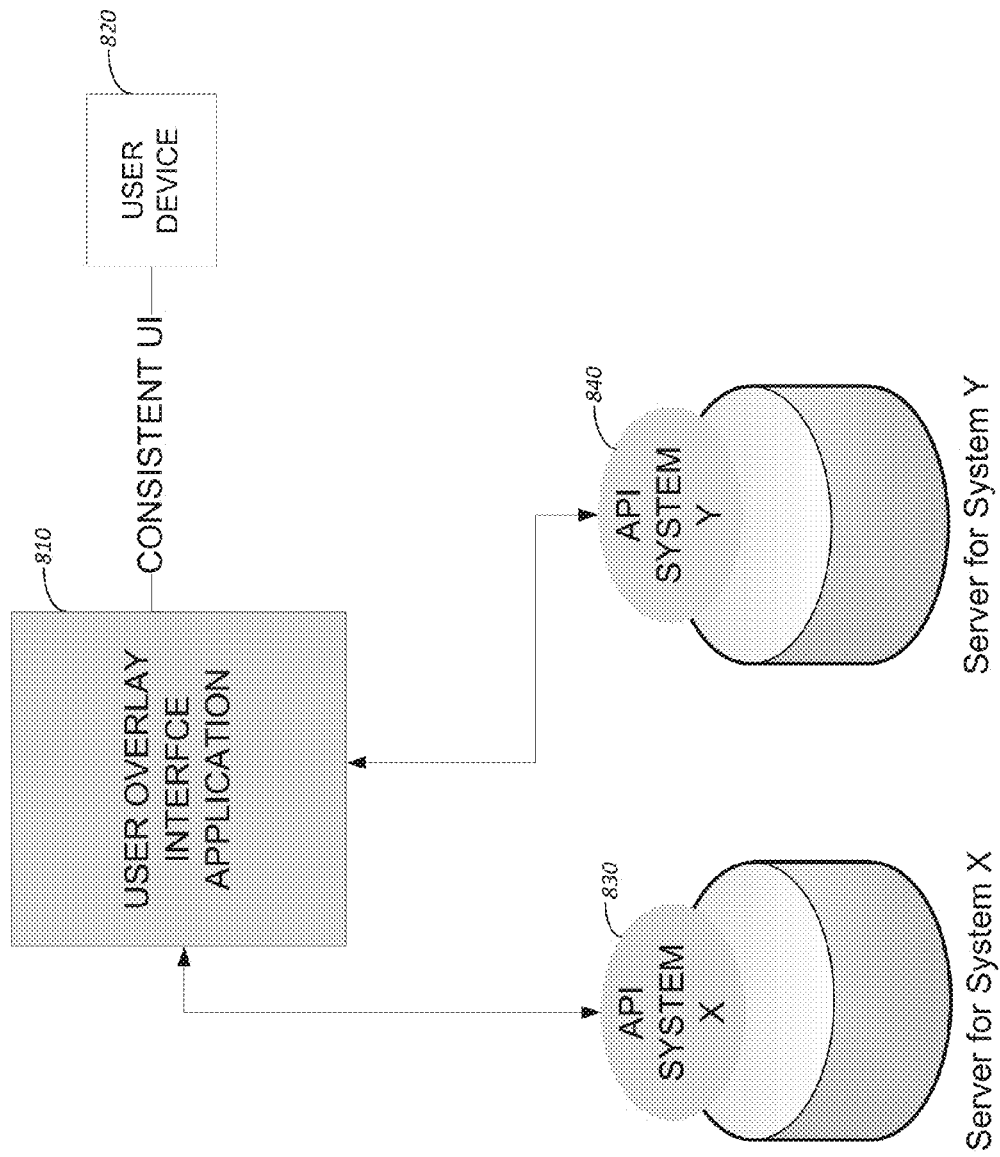
FIG. 8 is a block diagram of a system configuration in accordance with an example embodiment.

In some applications such as FIG. 8, the user overlay interface application 810 accesses the Application Programming Interface (API) 830, 840 of multiple sites to capture functionality and apply the functionality of system X to system Y. In this situation, system X may provide to user device 820 a viewing experience which rotates photos or thumbnails of products by presenting a first image then replacing that with a second image, or may provide a feed of images presented in a continuous stream of information, or may present the images with arrows on each side enabling the user to scroll through images. The UI for system Y may present the photos in a static format, where the user overlay interface application will apply the system X UI functionality for presenting images from system Y. In this way, the functionality and presentation of system Y is enhanced.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as may be known by a skilled artisan) as a module that operates to perform certain operations described herein.

In various embodiments, a module may be implemented mechanically or electronically. For example, a module may comprise dedicated circuitry or logic that may be permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that may be temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that may be physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it may be communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Storage Medium

Figure 9:
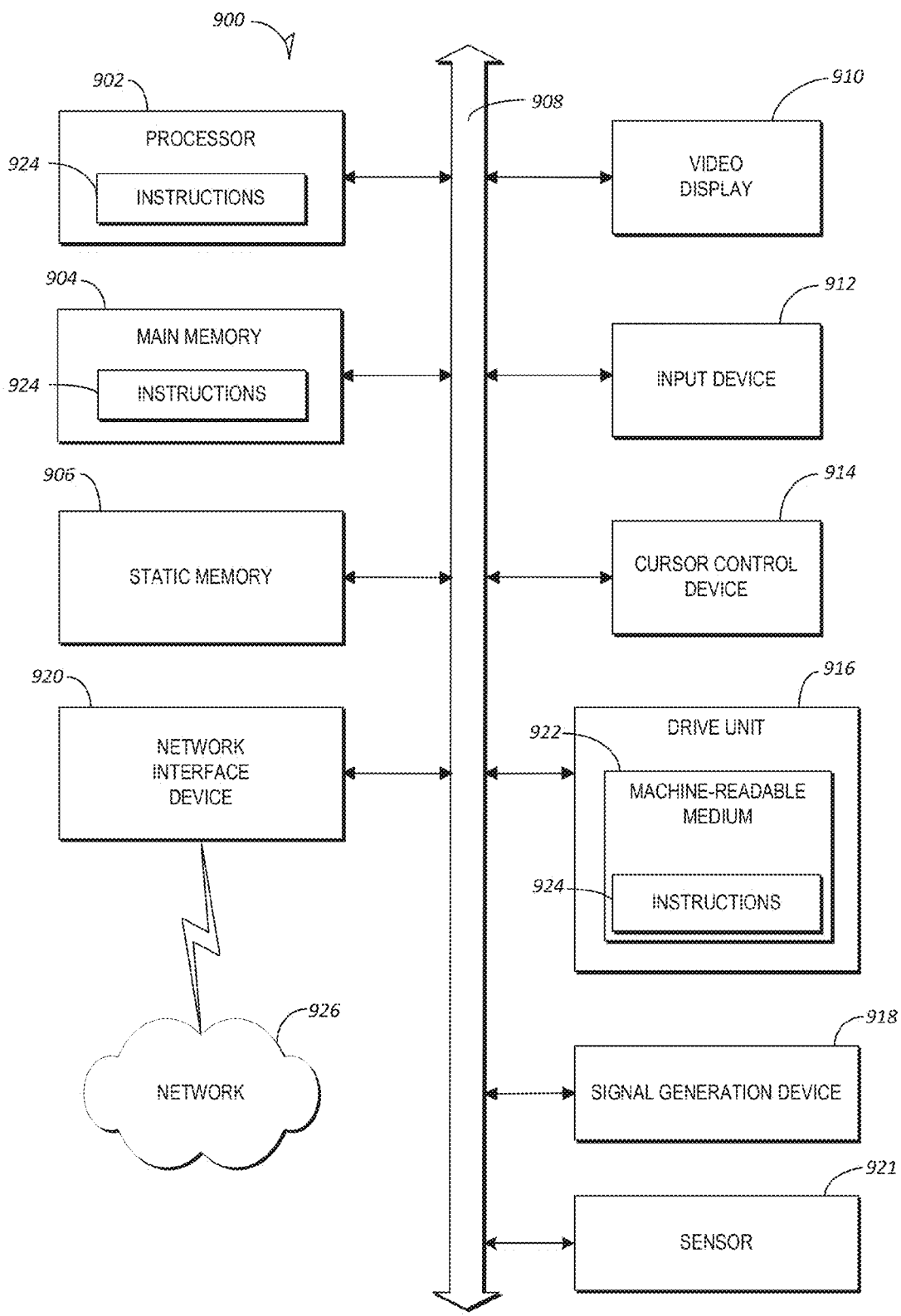
FIG. 9 is a block diagram of an example machine on which components of various embodiments of the system may be executed.

With reference to FIG. 9 an example embodiment extends to a machine in the example form of a computer system 900 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine may be illustrated, the term "machine" shall also be taken to include any collection of machines that individually or jointly execute a set (or multiple sets) of instructions to perform any one or more of the methodologies discussed herein.

The example computer system 900 may include a processor 902 (e.g., a central processing unit (CPU), a graphics processing unit (GPU) or both), a main memory 904 and a static memory 906, which communicate with each other via a bus 907. The computer system 900 may further include a video display unit 910 (e.g., a liquid crystal display (LCD) or a cathode ray tube (CRT)). In example embodiments, the computer system 900 also includes one or more of an alpha-numeric input device 912 (e.g., a keyboard), a user interface (UI) navigation device or cursor control device 914 (e.g., a mouse), a disk drive unit 916, a signal generation device 918 (e.g., a speaker), and a network interface device 920.

Machine-Readable Medium

The disk drive unit 916 includes a machine-readable storage medium 922 on which may be stored one or more sets of instructions 924 and data structures (e.g., software instructions) embodying or used by any one or more of the methodologies or functions described herein. The instructions 924 may also reside, completely or at least partially, within the main memory 904 or within the processor 902 during execution thereof by the computer system 900, with the main memory 904 and the processor 902 also constituting machine-readable media.

While the machine-readable storage medium 922 may be shown in an example embodiment to be a single medium, the term "machine-readable storage medium" may include a single storage medium or multiple storage media (e.g., a centralized or distributed database, or associated caches and servers) that store the one or more instructions. The term "machine-readable storage medium" shall also be taken to include any tangible medium that may be capable of storing, encoding, or carrying instructions for execution by the machine and that cause the machine to perform any one or more of the methodologies of embodiments of the present application, or that may be capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 924 may further be transmitted or received over a communications network 926 using a transmission medium via the network interface device 920 and utilizing any one of a number of well-known transfer protocols (e.g., Hypertext Transfer Protocol (HTTP)). Examples of communication networks include a local area network (LAN), a wide area network (WAN), the Internet, mobile telephone networks, Plain Old Telephone Service (POTS) networks, and wireless data networks (e.g., WiFi and WiMax networks). The term "transmission medium" shall be taken to include any intangible medium that may be capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present application. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived there from, such that structural and logical substitutions and changes may be made without departing from the scope of this disclosure. The Detailed Description, therefore, may be not to be taken in a limiting sense, and the scope of various embodiments may be defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present application. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present application as represented by the appended claims. The specification and drawings are, accordingly, to be regarded in an illustrative rather than a restrictive sense.

What is claimed is:

1. A computer operated method comprising:
   creating, at a computer system by one or more computer processors, a user overlay interface application that includes information comprising a first user interface layout format, the user overlay interface application configured to enable a client machine to perform the operation of:
      responsive to receiving a user interface presented in a second user interface layout format that comprises functional selectable icons, applying the user overlay interface application to the user interface presented in a second user interface layout format to modify the second user interface layout format to the first layout format by moving the location of at least some of the functional selectable icons of the user interface presented in the second layout format; and
   communicating the user overlay interface application to the client machine by at least one of the one or more computer processors.

2. The method of claim 1 wherein moving the location of the at least some of the functional selectable icons of the user interface presented in the second layout format comprises manipulating the information and the components provided and used by the user interface, and presenting information and the components at least some of the functional selectable icons of the user interface in the first layout format.

3. The method of claim 1 wherein the first layout format comprises the definition and functionality of a first user interface.

4. The method of claim 1 wherein the first layout format comprises one of a single page or a plurality of pages.

5. The method of claim 1 wherein applying the user overlay interface application does not substantially change the function of the information and the functional selectable icons of the user interface.

6. A machine-readable storage device having embedded therein a set of instructions which, when executed by a machine, causes execution of the following operations:
   creating, at a computer system by one or more computer processors, a user overlay interface application that includes information comprising a first user interface layout format, the user overlay interface application configured to enable a client machine to perform the operation of:
      responsive to receiving a user interface presented in a second user interface layout format that comprises functional selectable icons, applying the user overlay interface application to the user interface presented in a second user interface layout format to modify the second user interface layout format to the first layout format by moving the location of at least some of the functional selectable icons of the user interface presented in the second layout format; and
   communicating the user overlay interface application to the client machine by at least one of the one or more computer processors.

7. The machine-readable storage device of claim 6 wherein moving the location of at least some of the functional selectable icons of the user interface presented in the second layout format comprises manipulating the information and the components provided and used by the user interface, and presenting the information and the components of the user interface in the first layout format.

8. The machine-readable storage device of claim 6 wherein the first layout format comprises the definition and functionality of a first user interface.

9. The machine-readable storage device of claim 6 wherein the first layout format comprises a single page or a plurality of pages.

10. The machine-readable storage device of claim 6 wherein applying the user overlay interface application does not substantially change the function of the information and the functional selectable icons of the user interface.

11. A system comprising:
one or more computer processors configured to,
create a user overlay interface application that includes information comprising a first user interface layout format, the user overlay interface application configured to enable a client machine to perform the operation of:
responsive to receiving a user interface presented in a second user interface layout format that comprises functional selectable icons, apply the user overlay interface application to the user interface presented in a second user interface layout format to modify the second user interface layout format to the first layout format by moving the location of at least some of the functional selectable icons of the user interface presented in the second layout format; and
communicate the user overlay interface application to the client machine by at least one of the one or more computer processors.

12. The system of claim 11, the one or more computer processors are further configured to move the location of at least some of the functional selectable icons of the user interface presented in the second layout format by manipulating at least some of the information and at least some of the functional selectable icons provided and used by the user interface, and presenting the information and the components of the user interface in the first layout format.

13. The system of claim 11 wherein the first layout format comprises the definition and functionality of a first user interface.

14. The system of claim 11 the one or more computer processors are further configured to apply the user overlay interface application by an operation does not substantially change the function of the information and the functional selectable icons of the user interface.

15. A computer operated method comprising:
communicating, by a computer system to a client machine, a user overlay interface application that includes information comprising a first user interface layout format the user overlay interface application configured to enable a client machine to perform operations comprising, responsive to receiving a user interface presented in a second user interface layout format, applying the user overlay interface application to the user interface to modify the second user interface layout format to the first layout format;
wherein the user overlay interface application accesses an Application Programming Interface (API) of a first website and an API of a second website to capture functionality of the first website and apply the functionality of the first website to the second website; and
receiving by the computer system from the client machine an acknowledgement that the user overlay interface application has been received.

\* \* \* \* \*